United States Patent [19]

McIntosh

[11] Patent Number: 4,876,135
[45] Date of Patent: Oct. 24, 1989

[54] FLOOR MAT WITH DISPOSABLE ABSORBENT PAD

[76] Inventor: Blair McIntosh, P.O. Box 69, Waterville, Quebec, Canada

[21] Appl. No.: 133,646

[22] Filed: Dec. 14, 1987

Related U.S. Application Data

[63] Continuation-in-part of Ser. No. 934,497, Nov. 24, 1986.

[51] Int. Cl.⁴ .......................... B47G 27/02; B32B 1/06
[52] U.S. Cl. ......................................... 428/74; 15/215; 15/216; 428/76; 428/102; 428/107; 428/128; 428/188; 428/304.4; 428/512; 428/537.5; 428/905
[58] Field of Search .................. 428/304.4, 476, 74, 428/188, 102, 103, 128, 512, 537.5, 905; 15/215, 216

[56] References Cited

U.S. PATENT DOCUMENTS 4,549,323 10/1985 Brockhaus .......................... 428/76
4,614,679 9/1986 Farrington, Jr. et al. .......... 428/138
4,664,959 5/1987 Dagenais et al. .................... 428/76

Primary Examiner—George F. Lesmes
Assistant Examiner—James B. Monroe

[57] ABSTRACT

A floor mat comprising a jacket member having a throat opening in a free edge thereof for receiving an insert sheet of absorbent material. The top sheet of the jacket has openings therein for the passage of foreign matter. The insert sheet is disposed under the top sheet and retains foreign matter disposed thereon through the openings in the top sheet. The back surface of the insert is coated with a water resistant coating. After the insert sheet is soiled it can be removed and cleaned or replaced by a new sheet with the soiled sheet discarded.

13 Claims, 2 Drawing Sheets

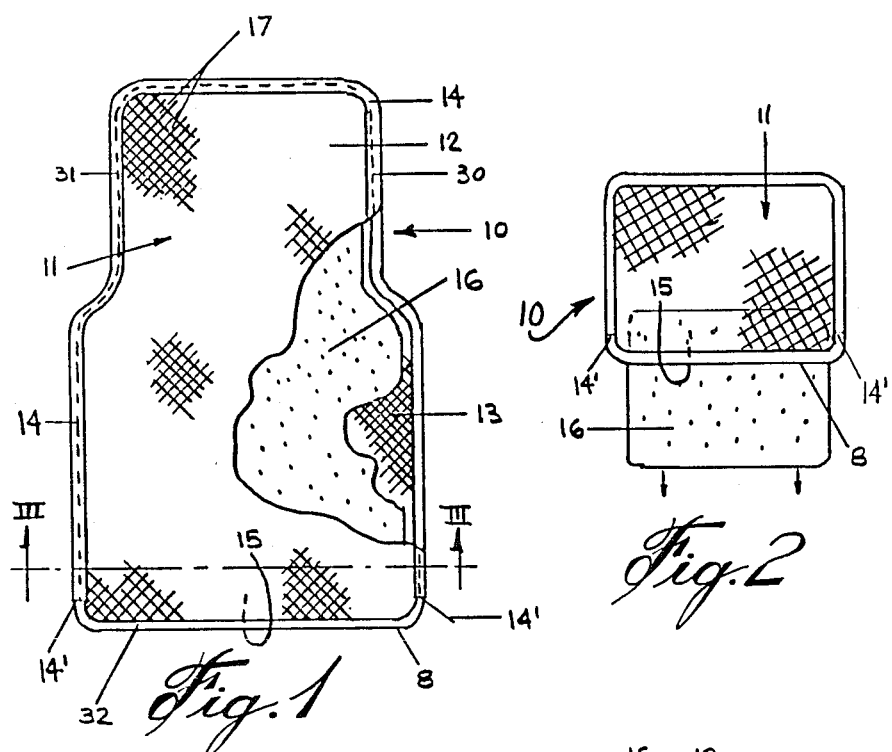
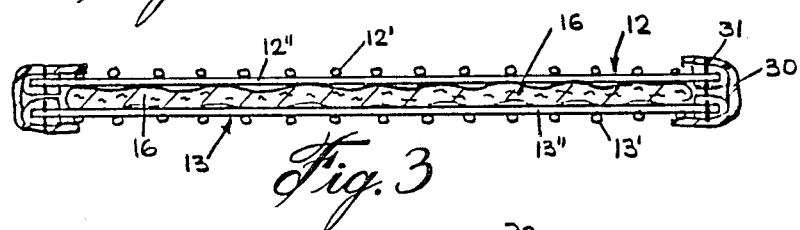
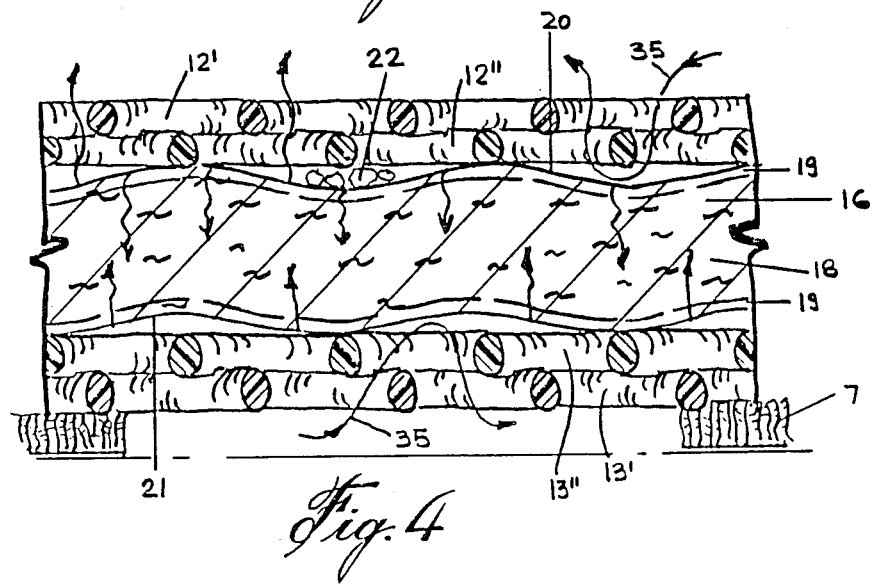

FLOOR MAT WITH DISPOSABLE ABSORBENT PAD

This is a continuation-in-part of my earlier application Ser. No. 934,497, filed on Nov. 24, 1986, and abandoned in favor of the present application.

The present invention relates to a floor mat comprised of a jacket member having a top sheet having passages therethrough and an absorbent sheet removably retained under the top sheet for retaining foreign particles and liquid matter.

It is known to provide a disposable carpet made from polyethylene coated sheet material with moisture absorbing paper layers. Such a carpet is disclosed for example in U.S. Pat. No. 3,517,407. This type carpet is known as a "throw away carpet" wherein the entire carpet is disposed after it has been soiled and a new carpet is utilized. On the other hand, U.S. Pat. No. 2,919,456 teaches a door mat wherein there is provided a base frame on which is directly secured a pad formed of absorbent material, for example, paper, towelling material and the like. After the pad becomes saturated or soiled it is replaced by removing a frame secured to the impermeable base and the pad is discarded and replaced by a fresh pad. This is a timely process and the pad is not protected against scuffing and tearing and thus becomes quickly unsightly and innefective.

It is a feature of the present invention to provide an improved door mat which comprises a jacket member wherein insert sheets of absorbent material may be disposed therein and easily discarded.

It is a further feature of the present invention to provide an improved floor mat, and preferably, but not exclusively, for use in automobiles and wherein an absorbent insert sheet is slide fitted in a jacket member and wherein the sheet is protected from both sides by a layer of mesh material on the top side and a solid or other water-resistant backing and wherein the backing may also be provided by the back side of the absorbent insert being coated.

Another feature of the present invention is to provide an improved automobile floor mat which will conform to the floor area of an automobile floor surface on which it is to be disposed, and which is highly pliable, and inexpensive to produce.

Another feature of the present invention is to provide an automobile floor mat which is capable of absorbing moisture from the top side of the floor mat and wherein the insert absorbing sheets are easily cleaned or replaced with a new one for the reason that they are inexpensive.

Another feature of the present invention is to provide an automobile floor mat having opposed surfaces constructed of durable waterproof material and wherein the insert absorbent sheet is a highly reinforced absorbent sheet having embossments on opposed surfaces thereof to trap soil material and liquids thus preventing them from spreading and further promoting evaporation and aeration.

According to the above features, from a broad aspect, the present invention provides a floor mat comprising a jacket member formed by a pair of opposed sheets secured together along a predetermined peripheral edge portion to define a throat opening in a non-secured edge portion of the opposed sheets for access to the area therebetween. At least the top one of the sheets has openings therein for the passage of foreign matter. An insert sheet, of absorbent material, is disposable between the opposed sheets through the mouth opening for retention of the foreign matter disposed thereon through the openings in the top sheet.

A preferred embodiment of the present invention will now be described with reference to the examples thereof as illustrated in the accompanying drawings in which:

FIG. 1 is a fragmented plan view of an automobile floor mat constructed in accordance with the present invention;

FIG. 2 is a plan view of a further floor mat constructed in accordance with the present invention and illustrating the manner in which the insert absorbant sheet is positioned in the mat;

FIG. 3 is a cross-section view along section line III—III of FIG. 1,

FIG. 4 is a detailed view of a floor mat constructed in accordance with the present invention.

Figure 5A:
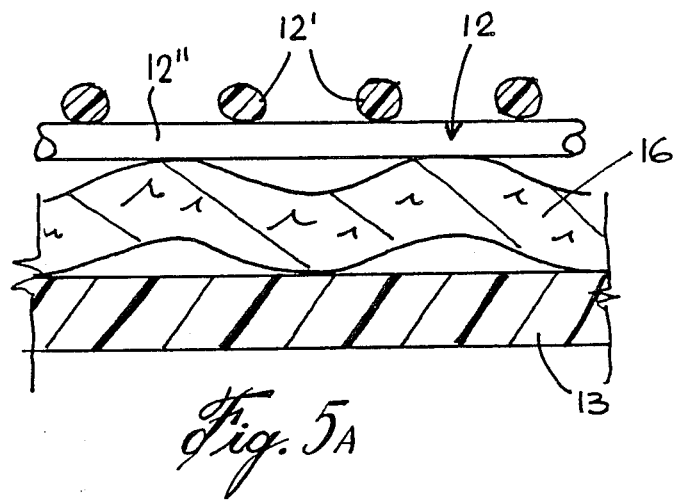
FIGS. 5A and 5B are further fragmented section views illustrating modifications of the floor mat.

Referring now to the drawings, and more particularly to FIGS. 1 to 3, there is shown generally at 10 an automobile floor mat constructed in accordance with the present invention. The floor mat comprises a jacket member 11 formed by a pair of opposed sheets 12 and 13 of meshing material, for example VEXAR material (a registered trademark of Dupont), which is a stronq, waterresistant, polyethylene compound. The opposed netting sheets 12 and 13 are secured along a predetermined major peripheral edge portion 14. As shown in FIG. 1, this securement terminates close to a free end edge 8 of the pad at locations 14' such as to provide a non-secured edge portion which constitutes a throat opening 15 along the end edge 8 to permit access to the space between the opposed sheets 12 and 13.

An insert absorbant sheet 16 is disposed between the opposed netting sheets 12 and 13 through the mouth opening 15. When the insert sheet 16 is positioned as shown in FIG. 1 it absorbs and retains foreign matter, such as liquids or dirt particles disposed thereon through the interstitial spaces 17 in the netting sheets 12 and 13. The insert absorbent sheet 16 is preferably constructed of a cardboard material which is reinforced and highly absorbent. The material may also be coated with a thin coating 19' of polyethylene on a back side to prevent water or other liquid substances from permeating therethrough.

Refering now additionally to FIG. 4, the insert absorbent sheet 16 is herein shown enlarged and constituted by a highly absorbent wood flourinner core having opposed layers of liner board 19 which are strong absorbent reinforced sheets. Such a composition is highly absorbent and can absorb approximately 5 times its own weight. The coated sheet 19' prevents soil, water and oil from permeating through the floor mat and soiling or staining the floor surface, such as the carpet 7 on which the floor mat may be resting. Any suitable absorbent material may be used as the insert sheet. The absorbent sheet 16 is also formed with embossments 20 on opposed surfaces whereby to form cavities 21 to trap liquids and or soil particles on the top surface, such as shown at 22, to prevent them from spreading.

It is also pointed out that when such a mat is removed from a vehicle, it does not release the soil particles as they are trapped in the mat.

Referring now more specifically to FIG. 3, there is shown a specific manner of construction of the jacket member 11 and as herein shown, the netting sheets 12 and 13 are each formed by two layers of fiber strands 12' and 12" and 13' and 13", respectively. The strands of each layer of each sheet 12 and 13 are oriented to intersect the strands of the opposed layers and bonded together at their junctures and form interstitial spaces or openings 17 for the passage of foreign matter such as liquids or soil particles.

As can be seen more clearly in FIG. 4, the outermost layers of strands, namely strands 12' and 13', are supported and separated from the outer surfaces of the insert sheet 16 by the innermost strands 12" and 13" so as to protect the outer surfaces of the insert absorbent sheet 16 from being scuffed and further protect the pant cuff portions of a person when resting on the mat when the person is sitting on an automobile seat. Thus, the pant cuff does not come into contact with fluids or soil materials which is retained by the insert absorbent sheet 16 and spaced below the outermost threads. Further, the strand meshings permit the insert 16 to breath and evaporate liquid retained therein as shown at 35. Also, the insert material protects the carpet 7 from being soiled and permits aeration of the carpet when the backing sheet 13 is a meshing. Thus, there is prevented mold and mildew from setting into the carpet and inhibiting rust to form in the sub-floor of the automobile.

The netting material, as above described, is a low-density polyethylene compound which is soft enough to allow the mat to conform to the shape of the automobile floor area on which it is placed, but rigid enough to protect the insert absorbent sheet 16 from scuffing and eventually breaking down. The low-density polyethylene compound is also unaffected by temperatures in the range of $-60°$ F.; to $+200°$ F., which is beyond the temperature range normally found inside an automobile, particularly during winter season where automobile heaters are often in operation. The material also does not become brittle during cold weather and is unaffected by ultra-violet radiation, thus being capable of maintaining its color.

The netting sheets 12 and 13 are secured along the predetermined peripheral edge portion 14 thereof by a strip molding 30 of waterproof material which receives a juxtaposed peripheral edge portion of the sheets 12 and 13 and retains them by a stitch seam 31. Alternatively, this securement may be effected by providing the strip moulding 30 of a plasticized material which will permit heat sealing of the strip with the peripheral edge portion of the sheets 12 and 13. The edge portions of each sheet may also be provided with an edge strip 32 which is secured all along the peripheral edge of each sheet and received within the strip molding 30 which extends along the predetermined edge portion 14.

As shown in FIG. 1, the insert absorbent sheet 16 is cut to easily fit within the jacket 11 and the embossements on the insert sheet are also visible through the intersitial spaces 17 and provide a variety of esthetically appealing texture and color combinations. The insert sheets may be of different color thus giving a totally different appearance to the mat.

It is also pointed out that the floor mat 10 can easily be cleaned by simply removing the insert sheet 16 and wipping or hosing the jacket 11 and shaking out exces water. The insert sheet 16 may then be placed back into the jacket or a new sheet inserted. Deodorizing liquid may also be applied to the sheet 16 to release a pleasant scent in the automobile.

Figure 5B:
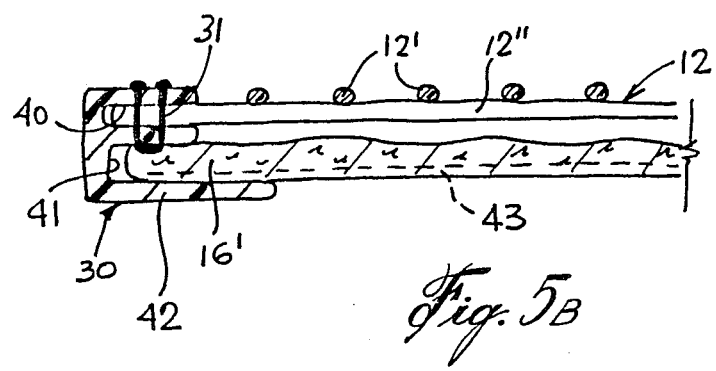

As shown in FIGS. 5A and 5B various modifications can be made to achieve the same object of the present invention which is the provision of a removable insert sheet. As shown in FIG. 5A, the back sheet 13 is provided as a solid and flexible waterproof sheet of rubber or other like flexible material. The top and bottom sheets 12 and 13 may also be bonded along the predetermined edge portion 14 by heat seal or an injection molded material may be applied thereto.

As As shown in FIG. 5B, the strip moulding 30' is formed with a top channel 40 to receive therein the netting sheet 12. The lower channel 41 is provided with an extended lower edge wall portion 42 whereby to retain the insert 16' therein. The insert 16' would be provided with a wear resistant waterproof coating 43 on the back side thereof. This insert 16' could also be washable and re-usable and also constitute the backing sheet of the jacket. Accordingly, there is provided a cost saving in that the insert also serves as the backing sheet 13. Still further, the shape of the mat can be modified to suit any intended use of the mat and, for example, a door mat as above described.

It is within the ambit of the present invention to cover any obvious modification of the examples described herein, provided such is interpretable on the claims herein.

I claim:

1. A floor mat comprising a jacket member formed by a pair of opposed sheets secured to each other along a predetermined peripheral edge portion to define a throat opening in an unsecured edge portion of said opposed sheets for access to the area therebetween, at least a top one of said sheets being formed of a non-absorbing, strong, water-resistant material having a plurality of openings therein for the passage of solid and liquid foreign matter, and an insert sheet of absorbent material disclosed between said opposed sheets through said mouth opening for the retention of said foreign matter disposed thereon through said openings in said top sheet, said insert sheet having at least a top surface thereof formed with embossements to trap foreign matter and arrest the flow of liquids deposited thereon through said openings, said insert sheet being constructed of a reinforced, highly-absorbent material having a bottom surface coated with a water-resistant material, said top sheet having an outer surface supported and separated over (a) said top surface of said insert sheet to protect said top surface of said absorbent sheet from being damaged by the feet of a person when applied to said outer surface and further to prevent objects resting on said outer surface from becoming soiled by liquids disposed spaced below said outer surface and resting on said top surface of said absorbent material.

2. A floor mat as claimed in claim 1 wherein a lower one of said opposed sheets is a solid flexible sheet of waterproof material.

3. A floor mat as claimed in claim 1 wherein said cardboard material is impregnated with a deodorizing liquid whereby to release a pleasant smelling scent.

4. A floor mat as claimed in claim 1 wherein said insert sheet is a cardboard material sheet coated on a bottom surface thereof with a waterproof polyethylene coating to prevent liquids from permeating therethrough.

5. A floor mat as claimed in claim 1 wherein said cardboard material is provided with embossements on opposed surfaces thereof.

6. A floor mat as claimed in claim 1 wherein said top one of said sheets is formed of a fiber netting consisting of two layers of fiber strands, each layer having their strands oriented to intersect the strands of the opposed layer with said intersecting strands interconnected at their junctures, said openings being defined by the interstitial spaces between said intersecting strands.

7. A floor mat as claimed in claim 6 wherein said netting is a low density polyethylene netting.

8. A floor mat as claimed in claim 6 wherein said mat is an automobile floor mat, said insert sheet and said jacket member having complementary colors, said embossements in combination with said sheets of netting material simulating a carpet surface, said mat being pliable to conform to the shape of an automobile floor area on which it is disposed.

9. A floor mat as claimed in claim 6 wherein both said opposed sheets are formed of non-absorbent fiber netting, said outermost layer of fiber strands being supported and separated from an outer surface of said insert sheet by said innermost layer of fiber strands so as to protect objects resting thereon from becoming soiled by liquids disposed on said outermost layer, as said liquids are channeled to said insert sheet through said interstitial spaces thus maintaining said outermost layer substantially dry.

10. A floor mat as claimed in claim 9 wherein said pair of opposed sheets are secured along said predetermined peripheral edge portion by a strip molding of waterproof material which receives peripheral edge portions of said sheets and retains them by securement means.

11. A floor mat as claimed in claim 10 wherein said securement means is a stitch seam disposed longitudinally along said strip molding and extending thereacross to fasten said peripheral edge portions of said sheets thereto.

12. A floor mat as claimed in claim 11 wherein said strip molding is a plasticized material heat-sealed about said peripheral edge portions of said sheets.

13. A floor mat as claimed in claim 11 wherein said strip molding is formed of vinyl or polyethylene material.

* * * * *